Figures 1, 2:
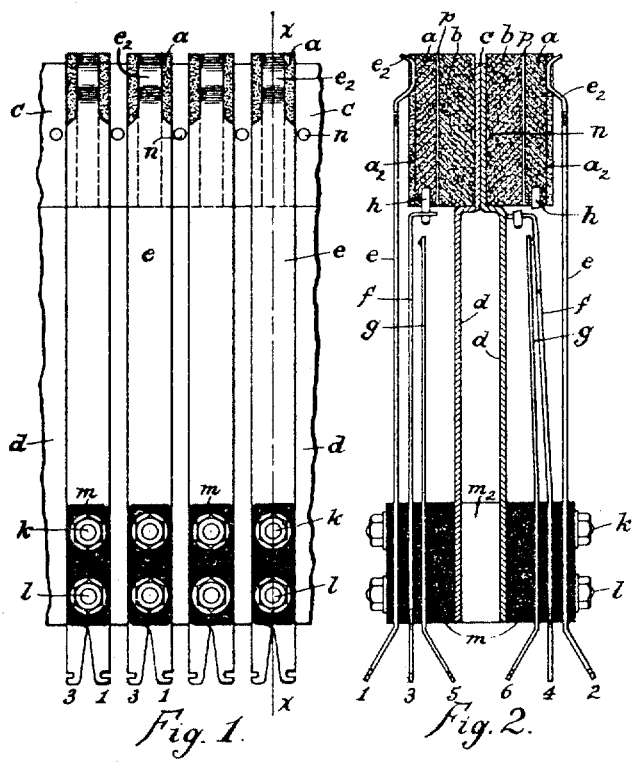

F. R. PARKER.
ELECTRICAL PROTECTIVE APPARATUS.
APPLICATION FILED MAY 29, 1914.

1,245,014.

Patented Oct. 30, 1917.

WITNESSES:
S. M. Jeffrey
Frances N. Parker.

INVENTOR:
Frederick R. Parker.

UNITED STATES PATENT OFFICE.

FREDERICK R. PARKER, OF CHICAGO, ILLINOIS.

ELECTRICAL PROTECTIVE APPARATUS.

1,245,014.      Specification of Letters Patent.      Patented Oct. 30, 1917.

Original application filed August 20, 1904, Serial No. 221,519. Divided and this application filed May 29, 1914. Serial No. 841,728.

*To all whom it may concern:*

Be it known that I, FREDERICK R. PARKER, a citizen of the United States of America, residing at Chicago, in the county of Cook and State of Illinois, have invented new and useful Electrical Protective Apparatus, of which the following is a specification, reference being had to the accompanying drawings, illustrating one form of my invention.

My invention relates to apparatus for protecting electrical circuits and apparatus from injurious electricity of various forms, this application being a division of my copending application Serial No. 221,519, filed August 20, 1904.

The principal object of this present invention is to provide improved and simplified electrical protective apparatus as and of the character herein set forth. Other objects will be apparent from the following specification.

In protective apparatus for electrical circuits and apparatus, such, for example, as the apparatus of telephone systems, or other circuits or systems, it is the usual practice to employ high-potential electricity arresters to protect the said circuits and apparatus from high-voltage currents or charges of electricity, such as lightning, and electrothermal devices to protect the said circuits and apparatus from "sneak currents," that is, from currents of electricity slightly in excess of the normal, which currents, in time, may burn out certain parts of the apparatus, due to a gradual heating. Heretofore there has been employed a certain class of devices for the high-potential electricity arresters and a distinctly different and separate class of devices for the electrothermal protectors.

In my present invention I combine both of the above-mentioned classes of devices and thereby produce a single device which embodies both a high-potential electricity arrester and an electrothermal device, and which serves all of the purposes of both. Thus I provide a single device which has a small number of parts, to take the place of the two distinctly different devices, and which, on account of its simplicity, may be very cheaply manufactured and very economically, efficiently and effectively utilized.

The advantages of my single device over the two distinctly different devices generally used, are very apparent and will be readily seen from the following detailed description which refers to the accompanying drawings illustrating one form of my invention.

In this invention I also provide an improved and simplified electrothermal protector which is very certain in its operation. I also provide means whereby abnormal electrical conditions in the high-potential electricity arrester may cause the operation of electrothermal mechanism to automatically disrupt a circuit leading to the arrester, and also connect a portion of this circuit to earth if desired. Either one or both of these purposes may be accomplished, as desired, or the arrester may be adapted to control or switch various circuits upon abnormal electrical conditions therein. It will be readily seen that this feature in a high-potential electricity arrester is very advantageous.

Figure 3:
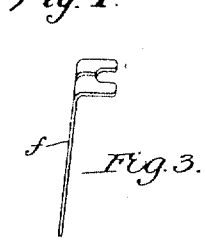

In the accompanying drawings illustrating one form of my invention, Figure 1 is a side elevation of a series of the devices of the invention mounted on a suitable supporting plate; Fig. 2 is a cross-sectional view of the apparatus of the invention, taken on line $x\ x$ of Fig. 1, with portions shown in elevation, showing the protective devices mounted on opposite sides of the supporting or mounting plate; and Fig. 3 is a perspective view of a portion of spring member $f$ of the apparatus of Figs. 1 and 2, showing the detailed construction thereof. Like characters refer to like parts in the several figures.

By reference to the drawings it will be seen that the mounting plate for the protective apparatus is preferably composed of two sheet-metal strips $d\ d$ preferably formed as shown and secured together along one edge $c$ preferably by suitable rivets $n\ n$, the rearward portions of the strips or plates $d\ d$ being spaced apart over the body thereof and held in such position by a suitable distance piece $m_2$. This mounting plate $d\ d$ is preferably grounded and is preferably of such a length that a number of protective devices may be mounted on each side thereof as desired. It is not essential to form the mounting plate or ground plate $d\ d$ as described, as various plates or supports, such as a part of the iron work of a distributing board, a protector rack, a cable head, etc., may be used for this purpose.

As the apparatus mounted on opposite sides of the mounting plate $d\ d$ is in duplicate sets, I will describe in detail the apparatus on one side only of this plate $d\ d$, as follows:—$e$, $f$ and $g$, are spring members which are mounted preferably flatwise on the mounting plate $d\ d$ by means of bolts $k$ and $l$, these spring members being suitably insulated from each other and from the mounting plate $d\ d$ by suitable insulating bushings and washers $m$. The protector device proper, comprises conducting members $a$ and $b$ which are held adjacent to each other but insulated from one another by a thin dielectric $p$. This protective device is removably inserted between the free end of spring $e$ and the tongue portion $c$ of the mounting plate $d\ d$, the member $b$ being placed between the rivets or pins $n\ n$ which hold the device against lateral displacement. The conducting members $a$ and $b$ are preferably made of carbon or graphite, but may be made of other suitable materials, the member $a$ being of sufficient resistance to produce heat for operating the device upon the passage therethrough of an abnormally large current. Spring $e$ is preferably provided with a narrow portion $e_2$ at its free end adapted to fit into a groove $a_2$ in the member $a$, to hold the latter against lateral displacement. It will be seen that spring $e$ does not bear against the member $a$ along substantially its entire length, as is usual in ordinary lightning arresters, but merely engages the member $a$ near one end thereof so as to provide a conductive circuit through the body of $a$ for nearly its entire length. This arrangement is provided for giving the proper heating effect in the thermal element $a$. A heat-susceptible pin $h$ of conducting material, preferably of a low-melting-point solder, is inserted into a hole in one end of the block or member $a$ so as to be firmly held in place thereby. The spring $f$ is provided with a forked portion at its free end, preferably bent at right-angles to the body portion of the spring, adapted to firmly grasp the pin $h$ as shown. The tension of springs $e$ and $f$ is toward the ground plate $d\ d$. Spring $g$ is an alarm spring, and is provided when an alarm circuit for the protective apparatus is required. In a telephone system the line conductors are preferably connected to terminals 3 and 4 which lead to springs $f\ f$ respectively, the switchboard conductors are connected to terminals 1 and 2 which lead to springs $e\ e$ respectively, and the alarm circuit conductors are connected to terminals 5 and 6 which lead to springs $g\ g$ respectively.

The thermal protector circuit through the device is from switchboard terminal 1 (or 2), through spring $e$, heat producing member $a$, pin $h$, and spring $f$ to line terminal 3 (or 4). The lightning arrester circuit through the device is from line terminal 3 (or 4), through spring $f$, pin $h$, conducting member $a$, dielectric $p$, conducting member $b$, and ground plate $d\ d$ to ground. The alarm circuit is from terminal 5 (or 6), through spring $g$, and through a portion of the free end of spring $f$ to the ground plate $d\ d$ when the thermal protector is operated.

When a high-potential current or charge of electricity, such as lightning, comes to the protective apparatus over the line spring $f$, it passes through spring $f$, pin $h$, conducting member $a$, arcs through dielectric $p$ to conducting member $b$, and then passes from $b$ through plate $d\ d$ to ground, the lightning arrester $a\ p\ b$ thus protecting the switchboard circuit and apparatus connected with terminal 1 (or 2) from the high-voltage electricity.

When a current of electricity slightly in excess of the normal traverses the resistance member $a$ for a short length of time, such current being of too low a voltage to arc across the dielectric $p$, or when a larger low-voltage current traverses the resistance member $a$, it heats the resistance member $a$, and when the heat is sufficient it softens or weakens the heat-susceptible pin $h$ whereupon the spring $f$ preferably pulls or shears the pin $h$ apart as shown on the right of Fig. 2 and makes contact with the ground plate $d\ d$ as shown. This operation of spring $f$ opens the circuit between the line and switchboard springs $f$ and $e$, respectively, thus stopping the flow of current through the heat-producing member $a$, and also grounds the line spring $f$. Thus it will be seen that the objectionable current in spring $f$ is automatically switched from the switchboard spring $e$ and the apparatus connected therewith, to ground, which protects the switchboard circuit and apparatus from the harmful heating effect of the objectionable current. When spring $f$ operates, it also engages spring $g$ and thereby closes an alarm circuit between spring $g$ and ground plate $d\ d$.

When a continued electric discharge passes through the lightning arrester $a\ p\ b$, the heat of the arc will also heat and soften the pin $h$ and thereby allow spring $f$ to pull or shear it apart and operate as above described. In this case the high-voltage current in spring $f$ will be switched to ground by the spring $f$ engaging the ground plate $d\ d$, which stops the arc in the arrester and protects the apparatus and switchboard circuit from the dangers of the high-voltage current. Such a high-voltage current may come from a cross of the line leading to the spring $f$, with a high-voltage line.

In restoring the apparatus to operative condition after the operation of spring $f$, the portion comprising the block $a$ and pin $h$ may be repaired or replaced by a similar new portion, and the spring $f$ engaged with the pin $h$ as originally.

The device of this invention is also provided with means for facilitating the testing of the different circuits therethrough. For this purpose the contact members of a testing plug may be inserted between the conducting member $a$ and the portion $e_2$ of spring $e$, on either or both sides of the ground strip $c$, to open the respective contacts between springs $e$ $e$ and their conducting members $a$ $a$ and thereby allow the different circuits, such as the line and switchboard circuits, to be tested.

I desire it to be understood that the conducting members or electrodes $a$ and $b$, and especially the heat-producing member $a$, may be shaped and proportioned as desired, to fulfil the requirements.

Furthermore, I desire it to be understood that the heat for causing the operation of the thermally-operable device may be produced by various forms of electric currents, by a continued arc through the arrester, or by a strong arc of short duration.

I do not wish to limit this present invention to the particular device herein shown, nor to the particular details of construction shown, as various modifications thereof may be made or utilized without departing from the scope of the appended claims.

I further desire it to be understood that the device of this invention may be adapted for use on various circuits and in various systems, and also under various conditions.

Certain features of the protector herein set forth form the subject-matter of my United States Letters Patent No. 1,238,728, dated Aug. 28, 1917, of which this present application is a division.

What I claim as my invention is:

1. The combination with an electrical heating device having a heater of aggregated comminuted material, of a conducting member holding the heating device in place and making electrical connection therewith, a one-piece spring member, and heat-susceptible material making actual contact with the said spring member and connecting same with the heating device, the said spring member exerting a shearing stress on the said heat-susceptible material tending to disrupt the said heat-susceptible connection.

2. The combination with electrothermal apparatus having a resistance heater device, of a conducting member holding the resistance heater device in place and electrically connected therewith, a one-piece conducting member, one of the said conducting members being a spring member, and heat-susceptible material normally connecting the second-mentioned conducting member with the resistance-heater device and holding the said spring member under tension, the said second-mentioned conducting member being in actual contact with the heat-susceptible material and exerting a shearing stress on the latter tending to disrupt the heat-susceptible connection.

3. The combination with electrothermal apparatus having a heating device, of a conducting member holding the heating device in place and electrically connected therewith, a one-piece spring member, and heat-susceptible material normally connecting the said spring member with the heating device and holding said spring member under tension, the said spring member being in actual contact with the heat-susceptible material and exerting a shearing stress on the latter tending to disrupt the heat-susceptible connection.

4. The combination with electrical protective apparatus having a heating device, of a one-piece spring member, and heat-susceptible material normally connecting the said spring member with the heating device, the said spring member being in actual contact with the heat-susceptible material and exerting a shearing stress on the latter tending to disrupt the said heat-susceptible connection.

5. In automatically-operable protective apparatus having a suitable support and an excess-current resistance-heater device, a one-piece conducting member mounted to the said support, and heat-susceptible material normally connecting the said conducting member with the resistance-heater device, the said conducting member being in actual contact with the said heat-susceptible material and exerting a shearing stress on the latter tending to disrupt the said heat-susceptible connection.

6. The combination with electrical protective apparatus having a suitable support and a heating device, of a spring member mounted to the said support and having the free end thereof extending at substantially right-angles to the body portion and integral therewith, and heat-susceptible material normally connecting the said free end of the spring member with the heating device, the said free end of the spring member being forked and actually engaging the said heat-susceptible material and exerting a shearing stress on the latter tending to disrupt the said heat-susceptible connection.

7. In automatically-operable protective apparatus having a suitable support and a heating device, a conducting member mounted to the said support and having the free end thereof extending at substantially right-angles to the body portion and integral therewith, and heat-susceptible material normally connecting the said free end of the conducting member with the heating device, the said free end of the conducting member being forked and actually engaging the said heat-susceptible material and exerting a shearing stress on the latter tending to disrupt the said heat-susceptible connection.

8. The combination with electrical protective apparatus having a heating device, of a spring member having a portion thereof extending at an angle with the body portion and integral therewith, and fusible metallic solder normally connecting the said angularly-extending portion with the heating device, the said angularly-extending portion being in actual contact with the said fusible metallic solder and exerting a shearing stress on the latter tending to disrupt the fusible connection.

9. In automatically-operable protective apparatus having a suitable support and a resistance-heater device, a conducting member mounted to the said support and having a portion thereof extending at an angle with the body portion and integral therewith, and fusible metallic substance normally connecting the said angularly-extending portion with the resistance-heater device, the said angularly-extending portion being in actual contact with the said fusible metallic substance and exerting a shearing stress on the latter tending to disrupt the fusible connection.

10. The combination with automatically-operable electrothermal apparatus having a heating device, of a spring member having a portion thereof extending at an angle with the body portion and integral therewith, and heat-susceptible material normally connecting the said angularly-extending portion with the heating device, the said angularly-extending portion being in actual contact with the said heat-susceptible material and exerting a shearing stress on the latter.

11. In automatically-operable electrothermal apparatus having a suitable support and a resistance-heater device, a conducting member mounted to the said support and having a portion thereof extending at an angle with the body portion and integral therewith, and heat-susceptible material normally connecting the said angularly-extending portion with the resistance-heater device, the said angularly-extending portion being in actual contact with the said heat-susceptible material and exerting a shearing stress on the latter.

12. The combination with an electrothermal device having a heating element of aggregated comminuted material, of a spring member in direct contact with the heating element and holding same in place, a one-piece spring member, and heat-susceptible material making actual contact with the second-mentioned spring member and holding same in electrical connection with the heating element, at least one of the said spring members being adapted to control the circuit of the said device when released.

13. The combination with an electrothermal device having a suitable support and a heating element of aggregated comminuted material, of a conducting member mounted to the said support, in direct contact with the heating element and holding same in place, a one-piece conducting member mounted to the said support, and heat-susceptible material making actual contact with the said one-piece conducting member and holding same in electrical connection with the heating element, one of the said conducting members being a spring member adapted to control the circuit of the said device when released.

14. The combination with an electrothermal device having a suitable support and a heating element, of a conducting member mounted to the said support, in direct contact with the heating element and holding same in place, a one-piece conducting member mounted to the said support, and heat-susceptible material making actual contact with the said one-piece conducting member and holding same in electrical connection with the heating element, one of the said conducting members being a spring member adapted to control the circuit of the said device when released.

15. In electrical protective apparatus having a suitable support therefor and a heating device, a one-piece spring member mounted to the said support, and fusible metallic solder normally connecting the said spring member with the heating device, the said spring member being in actual contact with the metallic solder and exerting a shearing stress thereon.

16. In electrical protective apparatus having a suitable support therefor and a heating device, a one-piece conducting member mounted to the said support and having a forked end portion, and heat-susceptible material normally connecting the said conducting member with the heating device, the said forked end portion of the said conducting member actually engaging the said heat-susceptible material and exerting a shearing stress thereon.

17. In electrical protective apparatus having a suitable support therefor and a heating device, a one-piece spring member mounted to the said support and having a forked end portion, and fusible metallic solder normally connecting the said spring member with the heating device, the said forked end portion of the said spring member actually engaging the said fusible metallic solder and exerting a shearing stress thereon.

18. In electrical protective apparatus having a suitable support therefor and a heating device, a one-piece spring member mounted to the said support and having a forked end portion extending at substantially right-angles to the body portion, and fusible metallic solder normally connecting the said spring member with the heating device, the said forked end portion of the said spring member actually engaging the said fusible metallic solder and exerting a shearing stress thereon.

As inventor of the foregoing I hereunto subscribe my name this 26th day of May, 1914.

FREDERICK R. PARKER.

Witnesses:
RAYMOND WICKHAM,
THEODORE KIRCHEL.

Copies of this patent may be obtained for five cents each, by addressing the "Commissioner of Patents, Washington, D. C."